US009503469B2

(12) United States Patent
Lin (10) Patent No.: US 9,503,469 B2
(45) Date of Patent: *Nov. 22, 2016

(54) ANOMALY DETECTION SYSTEM FOR ENTERPRISE NETWORK SECURITY (71) Applicant: EMC Corporation, Hopkinton, MA (US)

(72) Inventor: Derek Lin, San Mateo, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/794,708

(22) Filed: Jul. 8, 2015

(65) Prior Publication Data
US 2015/0381646 A1 Dec. 31, 2015

Related U.S. Application Data (63) Continuation of application No. 13/532,355, filed on Jun. 25, 2012, now Pat. No. 9,112,895.

(51) Int. Cl.
G06F 12/14 (2006.01)
H04L 29/06 (2006.01)
G06F 21/57 (2013.01)

(52) U.S. Cl.
CPC ....... *H04L 63/1425* (2013.01); *H04L 63/1416* (2013.01); *G06F 21/577* (2013.01); *H04L 63/1408* (2013.01); *H04L 63/1433* (2013.01)

(58) Field of Classification Search
CPC .......... H04L 63/1416; H04L 63/1433; H04L 63/1425; H04L 63/1408; G06F 21/577
USPC .............................................. 726/23, 22, 25
See application file for complete search history.

(56) References Cited

U.S. PATENT DOCUMENTS 8,260,914 B1 * 9/2012 Ranjan ................ H04L 61/1511 709/224
8,893,278 B1 * 11/2014 Chechik ................ H04L 63/145 713/188
9,112,895 B1 * 8/2015 Lin ...................... H04L 63/1425

* cited by examiner

Primary Examiner — Aravind Moorthy
(74) Attorney, Agent, or Firm — Van Pelt, Yi & James LLP (57) ABSTRACT Anomaly detection is disclosed, including: determining a set of anomalous events associated with an enterprise network; and determining a path of interest based at least in part on at least a subset of the set of anomalous events.

20 Claims, 10 Drawing Sheets

|  | Day 1 | Day 2 | Day 3 | Day 4 | Day 5 | Day 6 |
|---|---|---|---|---|---|---|
| Sensor 1 | ● |  |  |  |  | ● |
| Sensor 2 |  | ● | ● |  | ● |  |
| Sensor 3 |  |  | ● |  |  |  |
| Sensor 4 |  | ● | ● | ● |  | ● |
| Sensor 5 |  | ● |  |  | ● |  |
| Sensor 6 | ● | ● |  | ● |  |  |
| Sensor 7 |  |  |  |  | ● |  |
| Sensor 8 |  |  | ● |  |  | ● |
| Sensor 9 | ● |  |  |  | ● |  |

● = Determination of an anomalous event

| Paths of interest | Score |
|---|---|
| Path 1 | 98 |
| Path 2 | 93 |
| Path 3 | 87 |
| Path 4 | 56 |
| Path 5 | 34 |
| ... | ... |

FIG. 10

ANOMALY DETECTION SYSTEM FOR ENTERPRISE NETWORK SECURITY

CROSS REFERENCE TO OTHER APPLICATIONS

This application is a continuation of co-pending U.S. patent application Ser. No. 13/532,355, entitled ANOMALY DETECTION SYSTEM FOR ENTERPRISE NETWORK SECURITY filed Jun. 25, 2012 which is incorporated herein by reference for all purposes.

BACKGROUND OF THE INVENTION

One type of existing enterprise network defense is the Security Information & Event Management (SIEM) solution, which is typically driven by rules. However, the downside to using rules for network defense is that they are limited and static. For example, once rules are deployed, they do not adapt to traffic patterns to determine what is normal or not over time. In some cases, a rule-based system may yield high false positive rates, which renders the system to be less effective. Another type of enterprise network defense is the point solution, which addresses single aspects of network traffic at a time rather than a holistic view on all the information on the network. For example, a point solution such as the software Snort may capture packet-level anomaly but not higher level application anomaly. Yet another type of enterprise network defense is the data loss prevention (DLP) solution, which generally examines file data content without context of how files are received or from where. It would be desirable to have a solution that leverages more types of information associated with the enterprise network to capture anomalous behavior.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Detecting anomalous events that occur across multiple available sources is described. In some embodiments, an anomalous event comprises an incident and/or an entity associated with that incident that is suspected as being associated with a security threat. In some embodiments, an anomalous event is associated with a time indication (e.g., a time slot during which the event occurred or was detected). In some embodiments, sensors are configured to monitor a variety of resources of a network (e.g., an enterprise network) and to generate events as event conditions are detected. For example, data may include logged data and different types of sources available on an enterprise network may include virtual private network (VPN) logs, firewall logs, and mail server logs. In some embodiments, each sensor is built with at least a statistical model that is trained on historical data. For example, sensors may be configured to monitor data of the various types that are available on an enterprise network. As more data is received at the sensors, the sensors will determine which of the monitored data is anomalous (e.g., based on the data satisfying a predetermined condition or matching a pattern) and such anomalous events are stored. In some embodiments, periodically or in response to a trigger event, the set of stored anomalous events may be analyzed for the automatic detection of one or more paths of linked anomalous events, which are referred as paths of interest. For example, paths may be detected among the set of anomalous events over one or more dimensions (e.g., time or location). In some embodiments, each path of linked anomalous events may be scored based on one or more factors. The paths of interest that represent a holistic picture of the network at various levels, various different resources, and/or time and may be analyzed for threats that may change over time and may elude the detection of only single anomalous activities or specific types anomalous activities. For example, a sophisticated type of security threat that targets enterprise networks over time and through various types of attacks is the advanced persistent threat (APT).

Figure 1:
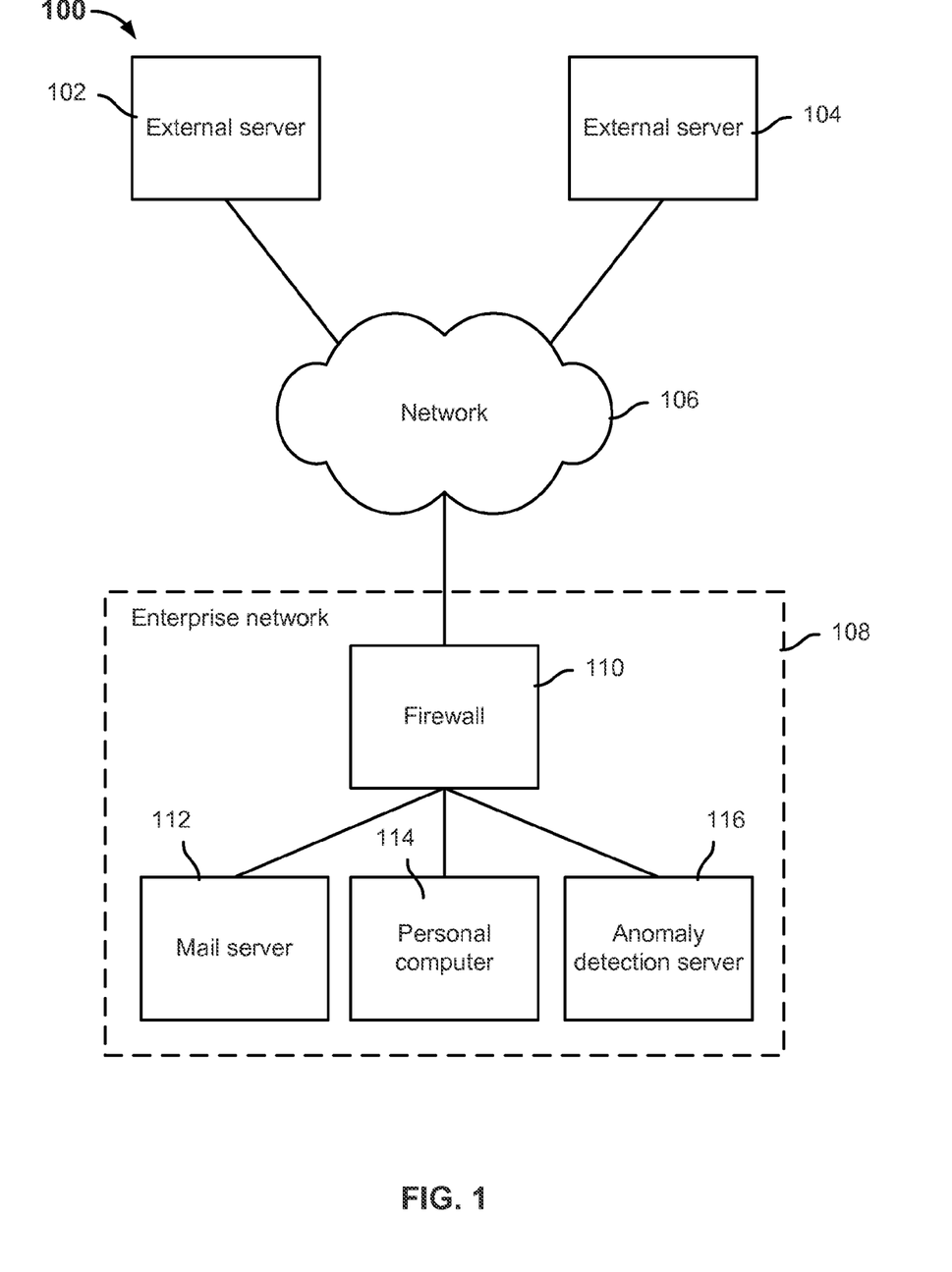
FIG. 1 is a diagram of an embodiment of a system for anomaly detection.

FIG. 1 is a diagram of an embodiment of a system for anomaly detection. In this example, system 100 includes enterprise network 108 which communicates with external servers 102 and 104 over network 106. Network 106 may include high-speed telecommunications and/or data networks. Externals servers 102 and 104 may comprise any servers that are not included within enterprise network 108.

Enterprise network 108 may be associated with an enterprise (e.g., a company, school, and/or other institution) and may provide network services for users who are affiliated with the enterprise. While the example shows only two external servers 102 and 104, enterprise network 108 may communicate with any number of external servers. In the event that one or both of external servers 102 and 104 is associated with anomalous activities, the external server(s) may seek to perform unauthorized access of protected files within enterprise network 108 through sending messages to a resource within enterprise network 108 and/or eventually downloading an agent (e.g., malware) onto such an internal resource to assist in performing anomalous activities. For example, during a security threat such as an APT, an external server associated with anomalous activities may attempt to infiltrate one or more resources internal to enterprise network 108 through a variety of attempts and vary its behavior over time so as to not be easily detected.

Enterprise network 108 includes firewall 110, mail server 112, personal computer 114, and anomaly detection server 116. Firewall 110, mail server 112, personal computer 114, and anomaly detection server 116 are exemplary devices within enterprise network 108 and enterprise network 108 may include more or fewer devices. Within enterprise network 108, firewall 110 is configured to filter out messages that are detected to not meet the specified security criteria, mail server 112 is configured to send and receive email messages sent to users associated with the enterprise, and personal computer 114 is configured to run applications and/or provide access to files associated with the enterprise to one or more users associated with appropriate security privileges (e.g., a user who submits the appropriate credentials to be authenticated). Any one or more of firewall 110, mail server 112, and personal computer 114 may send and receive messages to external servers such as external servers 102 and 104. Such communication with external servers may be documented through messages logs either stored by or on behalf of one or more of firewall 110, mail server 112, and personal computer 114.

Anomaly detection server 116 is configured to detect potential anomalous behavior (e.g., security threats) to enterprise network 108 through monitoring the event data of various resources within enterprise network 108 such as, for example, firewall 110, mail server 112, personal computer 114, in addition to other devices. In some embodiments, anomaly detection server 116 is configured to analyze the message logs of the resources within enterprise network 108 such as the stored message logs of firewall 110, mail server 112, personal computer 114 and/or other resources (e.g., users) within enterprise network 108. In some embodiments, anomaly detection server 116 is configured to learn historical data of the resources within enterprise network 108 that will be considered as "normal" behavior of the resources. Then once having learned what is "normal," anomaly detection server 116 may receive input associated with more recent/current data and flag the set of the current event data that is relatively improbable and therefore "anomalous" (given the historical data on which anomaly detection server 116 was trained). In some embodiments, anomaly detection server 116 is configured to store anomalous events that occur across different times and/or different resources internal to enterprise network 108 or resources external to enterprise network 108. Over time, anomaly detection server 116 may be re-trained using new event data (e.g., event data that was previously current) and therefore updated. In some embodiments, anomaly detection server 116 is configured to periodically detect links among the determined set of anomalous events to find series of anomalous events (which are also sometimes referred to as paths of interest) that may be related even if a subset of any one path did not seem related. For example, a path of interest may comprise events that took place over different time slots (where each time slot is a fixed period of time) and/or across different resources internal to enterprise network 108 or resources external to enterprise network 108. In some embodiments, each detected path of interest may be scored based on a set of factors and a list of paths ranked based on their respective scores may be presented for a user to analyze (e.g., and to take remedial action if appropriate).

By monitoring event data over time and across various resources and finding links among such data, anomaly detection server may detect security threats from external servers such as external servers 102 and 104 to enterprise network 108 that might not have been detected as single anomalous events and/or anomalous behavior that affects only a limited number of devices on enterprise network 108. Examples of techniques by which anomaly detection server 116 may determine sets of anomalous events and paths thereof are discussed in further detail below.

Figure 2:
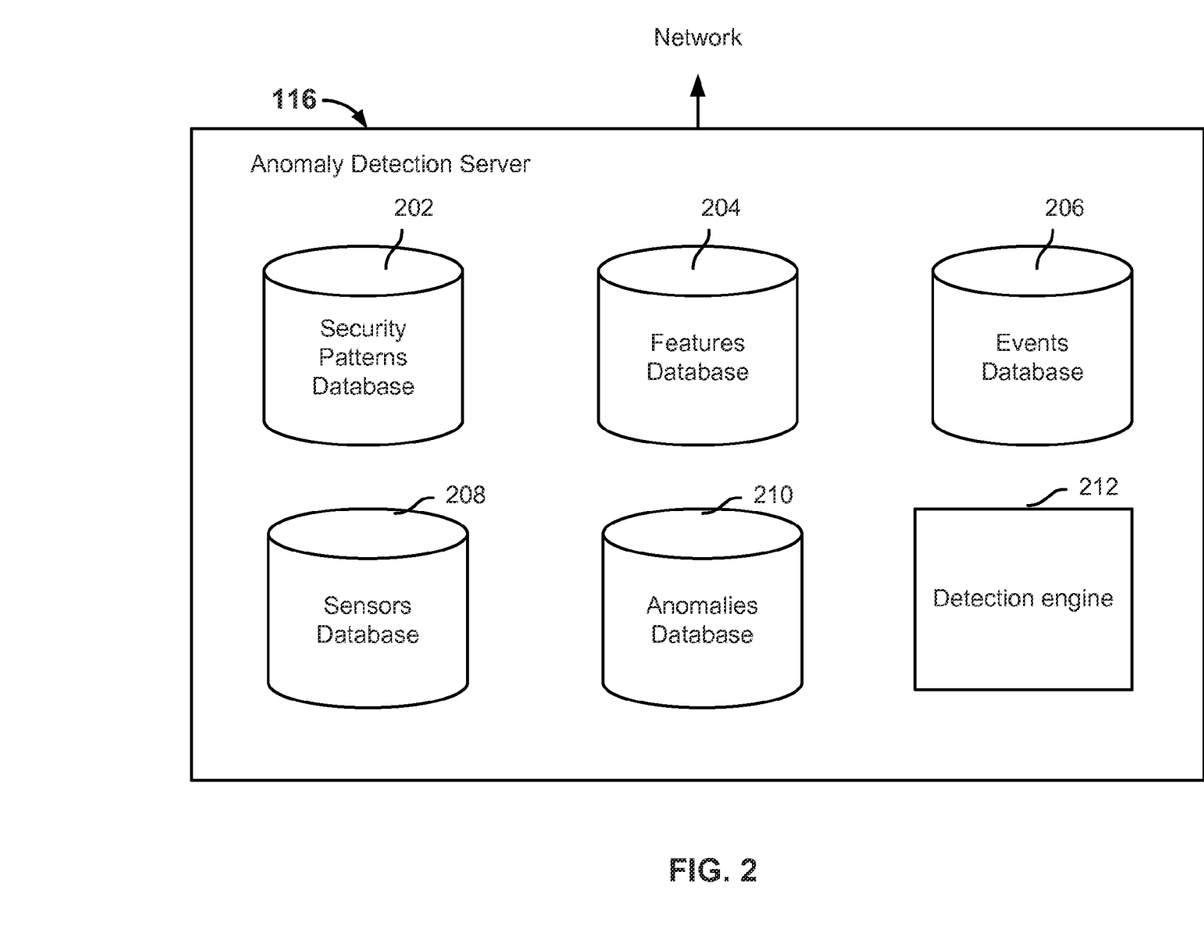
FIG. 2 is a diagram showing an embodiment of an anomaly detection server.

FIG. 2 is a diagram showing an embodiment of an anomaly detection server. In some embodiments, anomaly detection server 116 of system 100 may be implemented using the example of FIG. 2. In the example, the anomaly detection server includes security patterns database 202, features database 204, events database 206, sensors database 208, anomalies database 210, and detection engine 212. In some embodiments, each of security patterns database 202, features database 204, events database 206, sensors database 208, and anomalies database 210 may be implemented using one or more databases. In some embodiments, detection engine 212 may be implemented using one or both of software and hardware.

Security patterns database 202 is configured to store information associated with characterizing anomalous security events. In various embodiments, a security pattern is a repeatable behavior pattern associated with anomalous security events. In some embodiments, a security pattern is stored as a set of attributes. For example, attributes that describe a security pattern may be a set of text. In some embodiments, a security pattern may be determined by security experts. In some embodiments, security patterns may be associated with different types. For example, types of security patterns may be internet protocol (IP) address centric or user centric.

Below are some exemplary security patterns grouped by their associated security pattern types:
1) Internal network anomaly
  Portscan (full or half open) from internal host:
    High number of connectivities from IP (or IP+port) to other IPs (or IP+ports)
  Beaconing or phoning home to external control and command server associated with anomalous activities:
    External IP is busier than usual
    Regular inter-connectivity time Internal host connects to too many external IP Internal host generates a large volume of connection attempts to IP (or IP+port)

Internal host attempts to connect to systems on a watchlist

New but unusual creation:

New IP/MAC combination

New server serving TCP port 80 (http)

Deviation from baseline

Change in number of events per day on a device, per protocol: e.g., http, email, ftp Change in top N or bottom N machines in traffic Change in login/logoff access pattern of admin account Change in number of processes running at any given time Change in number of logged events per hour or day Logging message anomaly Log message has unusual mixture of weird characters; a data stuffing attack Message containing words like "fatal, panic, or password/passwd"

Proxy server anomaly

Rate of proxy server being used should remain constant. Change in rate of accesses per hour over a rolling period may be anomalous 2) Mail Server Anomaly Spike in incoming (e.g., phishing) email Look for new hosts originating SMTP traffic. Check firewall's deny records on port 25

3) Data Leakage

Single large or cumulatively large data file going out to an unusual external IP 4) User Login Anomaly Too many failed attempts from non-local or unknown domains Singleton events; something started but did not end with a recorded finish; e.g., login without logout, session opened without being closed User login from a new geographic location High velocity of user accounts on a certain IP, calibrate with context of the IP's volume and age High velocity of IP on this user account, calibrate with the context of the user and the user account's age Password changed by someone other than the user himself—especially by user ID 0 users with null logins 5) User Activity Anomaly Large number of file deletions, overwrite, or modify attempts Access data outside of his normal function or role Number of records retrieved by a single user, calibrate with time and the user's role Features database 204 is configured to store information associated with features. Generally, feature extraction is a technique that maps input information to a reduced set of information (i.e., features, which can be represented by mathematical vectors) such that the input information can be accurately recognized or classified based on the reduced representation of features. A feature is a variable that is used to represent a characteristic of the input information. Features are selected and defined by designers of a feature extraction and are processed to help decode/classify the input information, distinguish and/or disambiguate the input information, and/or accurately map the input information to the output values. As applied to the present application, feature extraction is used to analyze event data associated with various resources within an enterprise network. In some embodiments, features are designed based on at least some of the security patterns stored at security patterns database 202. As such, features designed based on security patterns are configured to mathematically represent behavior that may be associated with anomalous events. In some embodiments, designing features based on security patterns may comprise translating the qualitative descriptions of security patterns into quantitative variables that may be mathematically processed using statistical models. Exact feature implementations may depend on the type of statistical models to be used to process the features.

An example of the three features designed for the security pattern of "high velocity user accounts on a particular IP address" may include: 1) the number of users on this IP address in the last hour; 2) age of this IP address; and 3) the average number of users per day on this IP address in the last 10 days. While the number of users on this IP address in the last hour is the main feature for this security pattern, the IP address's age and average number of users in the last 10 days are used as context for calibration purposes. So, if these three features were extracted for a piece of event data, then the values corresponding to these features for that piece of event data would be processed in a statistical model associated with processing such features.

Events database 206 is configured to store event data associated with an enterprise network. In some embodiments, event data may include the message logs of resources of the enterprise network with external servers and/or other internal resources. For example, types of message logs may include firewall logs, virtual private network (VPN) logs, proxy logs, DHCP logs, mail server logs, web service logs, window event logs, intrusion detection logs (IDS) logs, and application logs. In some embodiments, events database 206 is continually updated with new event data and so the event data stored at events database 206 is stored with associated time indications associated with the time of their occurrence. For example, event data may be associated with time slots of fixed lengths (e.g., a time slot may be defined as 1 day). In some embodiments, event data may be stored with an absolute time slot (e.g., if a time slot were defined as 1 day, then the absolute time slot may be an identifier or a particular date at which the event occurred). In some embodiments, event data may also be stored with a relative time indication such as either a current time slot (e.g., the last day) or with historical time slots that occur prior to the current time slot (e.g., the period of the historical time slots may be defined as the six days prior to the last day). Over time, the relative time slots associated with the event data is updated. For example, if the current time slot (denoted by $T\_c$) was defined as the last day and the historical time slot (denoted by $H\_c$) was defined as the six days prior to the last day (so the combination of the current time slot and the historical time slots covers event data associated with the window of the last seven days), then after each day, new event data received within the last day becomes associated with $T\_c$, event data that was previously associated with $T\_c$ is now associated with $H\_c$, and event data that was logged more than six days prior to the last day is no longer associated with either current time slot $T\_c$ or historical time slots $H\_c$. The purpose of storing time indications such as time slots with event data is so that historical event data (e.g., event data associated with $H\_c$) may be used to train statistical models used to detect improbable (e.g., "anomalous") event data within the current event data (e.g., event data associated with $T\_c$). In various embodiments, such statistical models, are used as sensors to detect anomalous events within the current event data, as described below. Examples of types of statistical models include Naïve Bayes and Neural Networks.

Sensors database 208 is used to store sensors used to detect anomalous events within event data. In various embodiments, sensors are built from statistical models trained on historical event data such as historical event data stored at events database 206 and used to detect anomalous events within current event data such as current event data stored at events database 206. In various embodiments, sensors are designed based on security patterns such as those stored at security patterns database 202 and/or features such as features stored at features database 204. For example, a sensor may comprise one or more statistical models and may be associated with one or more security patterns. In various embodiments, because sensors are built from statistical models, using a sensor to analyze event data comprises inputting feature values extracted for each event data sample into the statistical models. For example, features values extracted for an event sample may be extracted from data specifically associated with the event and other data not necessarily specific to just the event. As such, through machine learning techniques, statistical models that are used as sensors may be trained on historical event data to recognize such data as being "normal" (i.e., not anomalous or potentially associated with a security threat). Then the sensors may detect which events within the current event data are associated with features that statistically deviate from the "normal" event data on which the models were trained. In various embodiments, as new event data is stored over time, the statistical models used for sensors are updated (re-trained) with the updated body of historical data. Put another way, models trained on event data associated with the historical time slots is used to predict anomalies in the current time slot.

In various embodiments, current event data that are determined by sensors to deviate from "normal" are referred to as being "anomalous." In some embodiments, sensors may be configured to score the analyzed event data and a predefined threshold score may be used to flag which events are anomalous and which are not. In some embodiments, a sensor may be designed to monitor specific attributes of event data, such as, for example, certain entities (e.g., certain users, hosts, or devices) associated with event data and so the sensor may flag a particular entity within event data as being anomalous. For example, a sensor built with an IP address-centric view will flag an anomalous IP address and a sensor built with a user-centric view will flag an anomalous user. So, an anomalous event may refer to a specific incident (e.g., logged message) and/or one or more attributes (e.g., entities, time slot of occurrence) associated with the incident. For example, an anomalous event may comprise a particular entity associated with a particular time slot or a particular message between multiple entities associated with a particular time slot. In some embodiments, a threshold may be specifically predefined for each sensor. In some embodiments, raw sensor scores can be optionally normalized so that each level of normalized output score is associated with a known number of events; this facilitates threshold setting for controlled false positive rate. One reason why sensor outputs may be normalized is because score spaces produced by different sensors could have different ranges and distributions. Thus, a single sensor score threshold will behave differently on different score spaces, in terms of number of events flagged. Such uncontrolled behavior is undesirable. But by performing score normalization, raw scores are transformed so that each level of output score is associated with known number of events falling within that level; this can be done with historically scored events. Then, score normalization is performed for all sensors. After performing such normalization, each level of normalized scores has a meaning that is in terms of expected number of events to be flagged. As such, an applied threshold now has known false positive rate. In various embodiments, flagged anomalous events are stored at anomalies database 210.

For example, a sensor based on the security pattern "high number of users on this IP address in the last X minutes." If X=10, then the model may include the following three features: 1) number of users on this IP address in the last 10 minutes (denoted as num_ip_10), 2) age of the IP address (denoted as age_ip), and 3) the average number of users per day in the last 10 days (ave_rate_ip). Based on the historical event data associated with H_c, a model such as Naïve Bayes (NB) or some other type is built to score Prob (anomaly|num_ip_10, age_ip, ave_rate_ip) for any IP address within the current time slot T_c. If there are 10,000 events in H_c that are associated with that IP address, then 10,000 samples are available for model building. If multiple time resolutions are desired for this security pattern, then additional models may be built to score Prob(anomaly|num_ip_60, age_ip, ave_rate_ip) for a resolution of 60 minutes. Given multiple models supporting different respective time resolutions, the score for an IP address in T_c time slot could be a function (e.g., a maximum or average function) of scores produced by these models.

In some embodiments, sensors may be designed to monitor event data associated with all or a subset of entities within an enterprise network. Where computational support is more abundant, more sensors may be configured to monitor more entities within the enterprise network and where computational support is more limited, sensors may be configured to monitor only a subset of entities within the enterprise network such as a smaller set of privileged users or enterprise assets.

Anomalies database 210 is configured to store each event flagged as being anomalous by a sensor with one or more attributes. In some embodiments, an anomalous event may be stored with attributes such as, for example, an associated user, device, host, source IP address, date, time, time slot, sensor determined score, and identifier of the sensor that flagged it. For example, for each event determined to be anomalous in the current time slot T_c, its associated entities are also stored. For example, the sensor for "number of users on this IP address in the last 10 minutes" may flag some IP addresses as being anomalous. For each such flagged IP address, a list of users and devices associated with this IP address within this current time slot T_c is recorded. These associated entities may be used by detection engine 212 to link together anomalous events.

Detection engine 212 is configured to detect anomalous events. In some embodiments, detection engine 212 is configured to build and/or update statistical models of sensors stored at sensors database 208. In some embodiments, detection engine 212 is configured to detect when a sensor sends off an alert associated with flagging an event as being anomalous and in response, to store that event and its attributes at anomalies database 210. In some embodiments, detection engine 212 is configured to periodically analyze the anomalous events stored at anomalies database 210 (e.g., associated with a certain period of time or number of time slots) to determine which anomalous events may be linked using one or more types of link analysis. For example, a simple example of link analysis may be to determine that two or more anomalous events (e.g., associated with the same or different time slots) are linked by virtue of having at least one shareable attribute (e.g., a common user) between them. A series of linked anomalous events is referred to as a path of interest and may comprise multiple anomalous events, each anomalous event linked to at least one other. In some embodiments, each link between two anomalous events may be scored based on factors associated with the attributes of the anomalous events and/or the list of associated entities (e.g., associated users and/or devices) stored for the anomalous events. For example, a flagged IP address can be linked to a flagged user from an earlier time slot if a device is shared between them. In some embodiments, detection engine 212 is configured to determine a score for each of the paths of interest based on heuristics in combining scores at time slots, weights attributed to each link and/or anomalous event attribute, and/or time lapse between linked anomalous events. For example, a score may be attributed to each link in a path of interest and the overall score for the path of interest may be a sum or average of all the individual link scores of the path. In some embodiments, detection engine 212 is configured to generate and present a list of paths of interest where the paths are ranked based on their respective scores.

Figure 3:
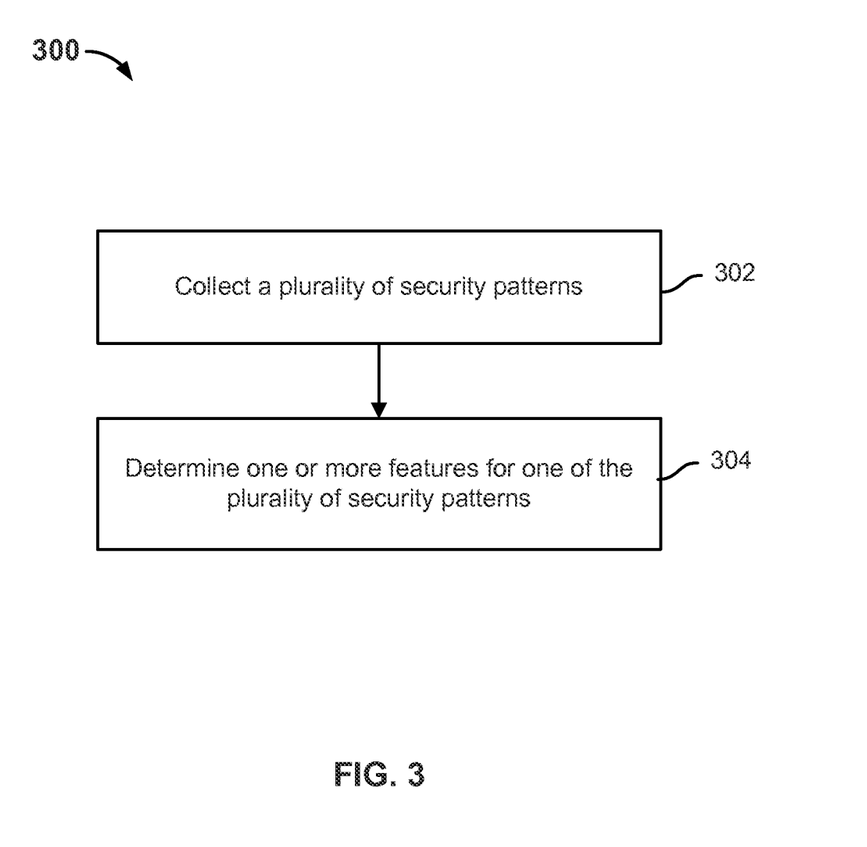
FIG. 3 is a flow diagram showing an embodiment of a process for determining features to be used in statistical models of sensors that detect anomalous events.

FIG. 3 is a flow diagram showing an embodiment of a process for determining features to be used in statistical models of sensors that detect anomalous events. In some embodiments, process 300 may be implemented at system 100.

At 302, a plurality of security patterns is collected. In some embodiments, security patterns are defined by security domain experts. For example, security domain experts may define security domain experts based on experience and/or empirical studies. As described above, in some embodiments, a security pattern is akin to a design pattern in software development and is designed to capture repeatable behavior patterns associated with anomalous security events.

At 304, one or more features for one of the plurality of security patterns are determined. As described above, in some embodiments, determining features for a security pattern comprises translating the qualitative nature of the security pattern into numerical or categorical attributes. In some embodiments, mapping a security pattern into one or more features is performed by data scientists and security experts. The feature(s) determined for a security pattern may be designed according to the type of statistical model chosen for the security pattern.

Figure 4:
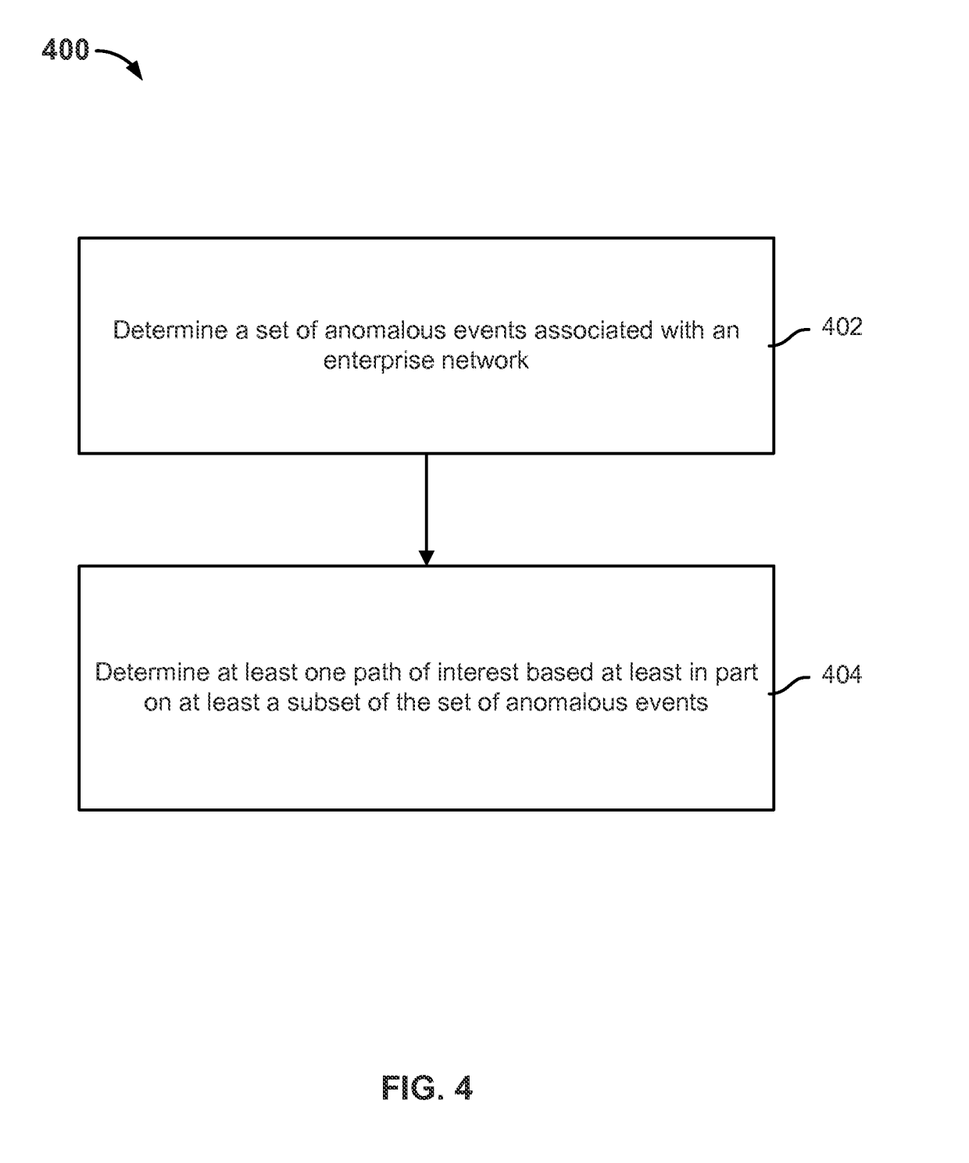
FIG. 4 is a flow diagram showing an embodiment of a process for anomaly detection.

FIG. 4 is a flow diagram showing an embodiment of a process for anomaly detection. In some embodiments, process 400 may be implemented at system 100.

At 402, a set of anomalous events associated with an enterprise network is determined. In some embodiments, the anomalous events may be associated with one or more sources of the enterprise network. Examples of one or more resources of an enterprise network may include users (e.g., with privileged access to files on the enterprise network), devices, and hosts. In some embodiments, message logs associated with communication between the resources of the enterprise network with each other and/or servers external to the enterprise network are stored as event data. In some embodiments, features associated with security patterns are determined for analyzing stored event data using machine learning techniques. In some embodiments, features may be determined using process 300. In some embodiments, statistical models are constructed to receive the determined features as input. The statistical model chosen for a particular security pattern may be used as a sensor to detect the type of repeatable anomalous security events that the security pattern is designed to flag. The statistical model is trained on historical event data associated with the security pattern so that the model can learn to recognize such data as being "normal" (i.e., "normal" event data is event data that is not anomalous). To use a sensor to monitor event data includes, in some embodiments, extracting the feature values associated with the sensor's statistical model for the event data and inputting such values into the model. In some embodiments, the sensor is configured to output a score associated with the probability that the inputted event data deviates from being normal (i.e., an event that deviates from "normal" is "anomalous"). Threshold scores may be predefined for the sensors to determine which events are anomalous. For example, an event data that is given a score above the threshold score may be flagged as being anomalous. Events flagged by the sensors built for the enterprise network are stored. In some embodiments, each anomalous event is stored with attributes such as, for example, an associated user, device, host, source IP address, date, time, time slot, sensor determined score, and identifier of the sensor that flagged it.

At 404, at least one path of interest based at least in part on at least a subset of the set of anomalous events is determined. In some embodiments, the set of stored anomalous events is periodically analyzed for links between anomalous events. For example, any appropriate form of link analysis may be used to determine a link (relationship) between anomalous events. In some embodiments, a path of interest may comprise a series of anomalous events, where a link is determined between every two adjacent anomalous events in the path. In some embodiments, anomalous events within a path of interest may be associated with the same time slot or different time slots (e.g., linked anomalous events may have occurred within the same time slot or within different time slots). In some embodiments, anomalous events within a path of interest may be associated with the same sensor or different sensors. In some embodiments, link analysis that may determine a link between two anomalous events based on the stored attributes of the anomalous events. For example, a link may be determined between two anomalous events that have at least one shareable attribute (i.e., an attribute that is common to both anomalous events). Examples of shareable attributes include explicit matching of user ID, IP addresses, and/or hosts. Other possible examples include matching on grouping information (i.e., two users belong to the same group, or have same resource usage profiles in the past). Such paths of interest may be further analyzed to determine for any indication of security threats and/or whether any remedial action (e.g., removing a compromised device from the enterprise network) needs to be taken. Paths of anomalous events may provide more information than any subset of events within each path. In some embodiments, an overall score is determined for each path of interest based on the anomalous events within the path and/or the links. For example, a separate score may be determined for each link in the path of interest based on heuristics, weighting schemes, and/or an aging scheme and the overall score of the path may be an accumulation of all the link scores. In some embodiments, the determined paths of interest may be presented in a list, where the paths are ranked by their respective overall scores.

Figure 5:
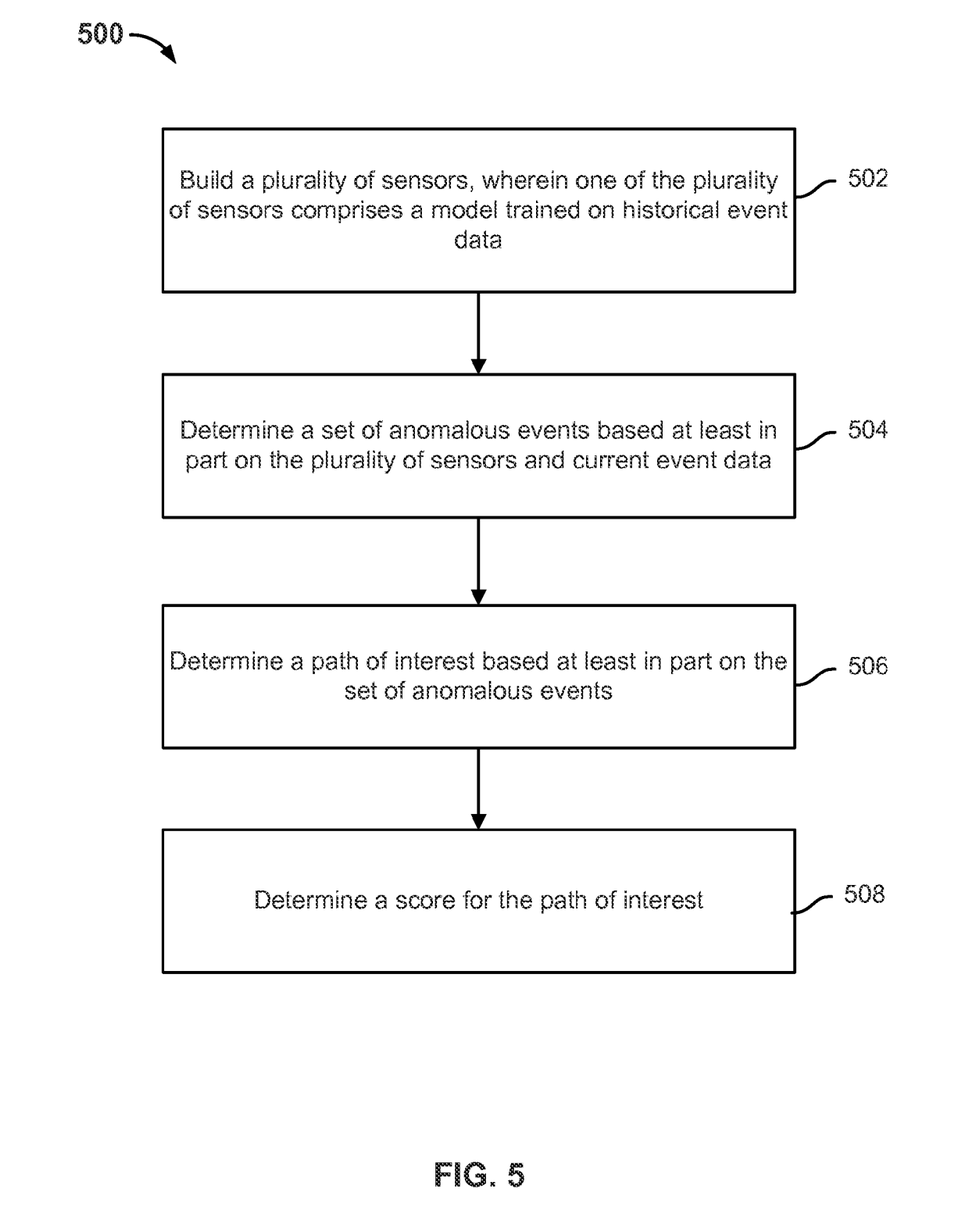
FIG. 5 is a flow diagram showing an embodiment of a process of anomaly detection.

FIG. 5 is a flow diagram showing an embodiment of a process of anomaly detection. In some embodiments, process 500 may be implemented at system 100. In some embodiments, process 400 may be implemented using process 500.

At 502, a plurality of sensors is built, wherein one of the plurality of sensors comprises a model trained on historical event data. For example, each sensor used to monitor event data associated with an enterprise network comprises a statistical model that receives features associated with one or more security patterns. The model is trained on historical event data (e.g., event data stored during the historical time slots). In some embodiments, the model is updated over time with updated sets of historical event data.

At 504, a set of anomalous events is determined based at least in part on the plurality of sensors and current event data. For example, the sensors are used to detect anomalous events among current event data (e.g., event data stored during the current time slot). For example, if a sensor scores an event above a certain threshold score, then the event is considered anomalous and stored with associated attributes (e.g., the current time slot during which it occurred and associated entities).

At 506, a path of interest is determined based at least in part on the set of anomalous events. Any appropriate type of link analysis is applied to the set of stored anomalous events to discover links (relationships) between anomalous events. For example, anomalous events across different time slots and/or sensors may be linked to form a path.

At 508, a score for the path of interest is determined. An overall score may be determined for each path of interest based on the anomalous events (and attributes thereof) within the path and/or links within the path.

Figure 6:
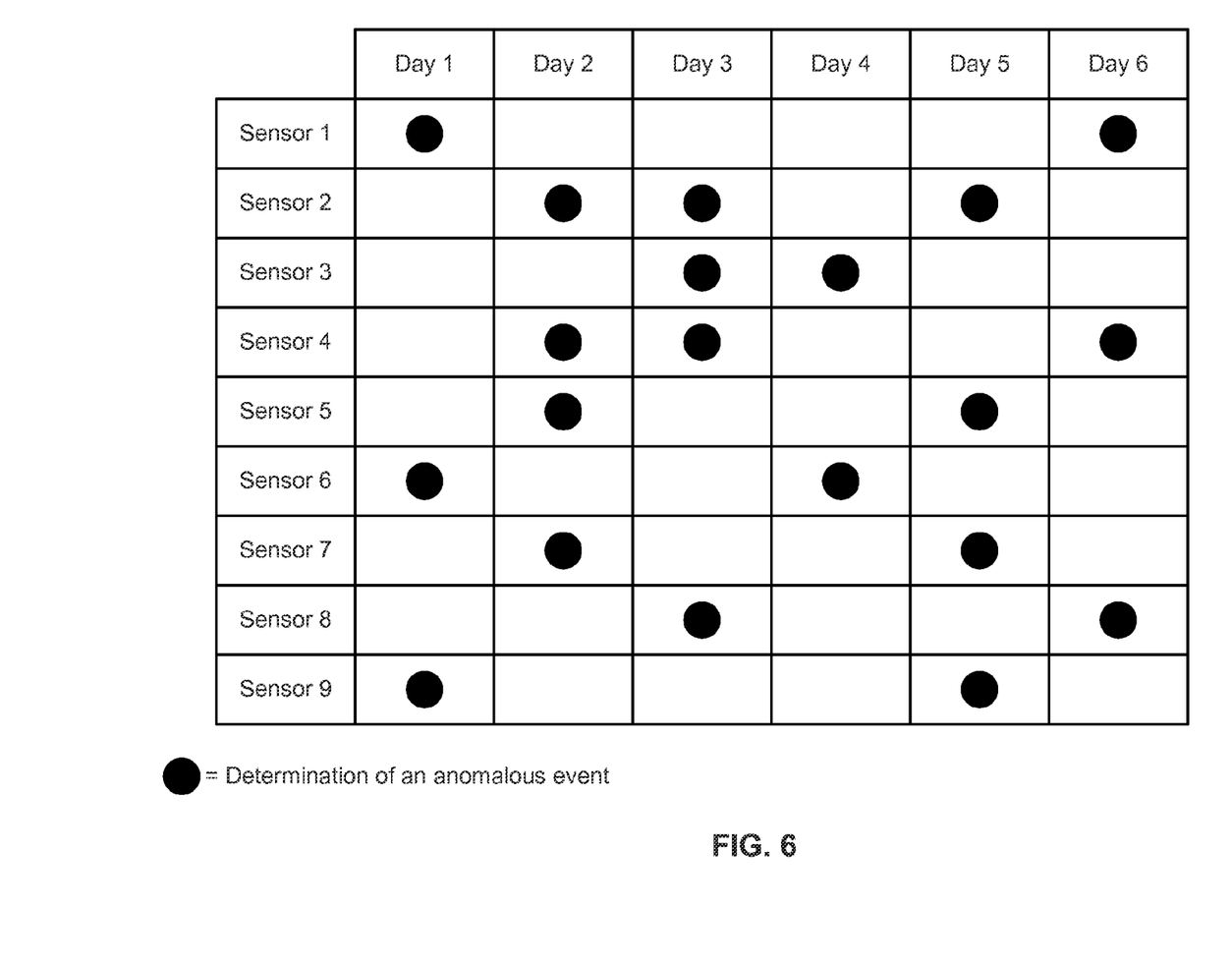
FIG. 6 is a diagram showing an example of anomalous events presented in a table.

FIG. 6 is a diagram showing an example of anomalous events presented in a table. In some embodiments, stored anomalous events associated with an enterprise network are periodically analyzed for paths of interest (e.g., after every N number of time slots). In the example, each time slot is defined to be 1 day long and anomalous events are analyzed every 6 days. In the example, the anomalous events that occurred within the last 6 days are included in the table. The columns of the table show each of the last 6 days and the rows show different sensor identifiers (e.g., "Sensor 1," "Sensor 2" and so forth) and whether each sensor has determined an anomalous event during each of the last 6 days. Each black circle indicates that the sensor had flagged an anomalous event that day. The table in the example implies that a sensor determines at most 1 anomalous event per time slot, but a sensor may actually determine any number of anomalous events during each time slot.

Figure 7:
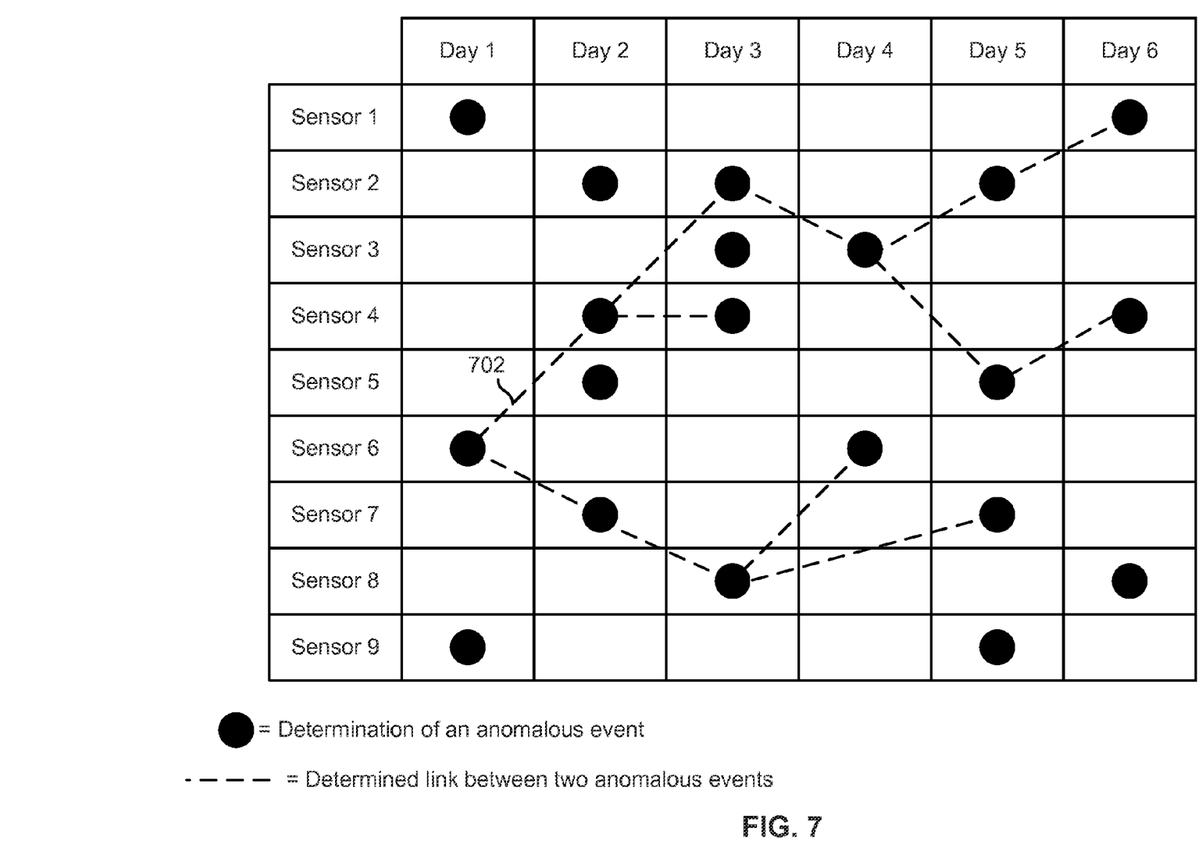
FIG. 7 is a diagram showing an example of links determined between anomalous events presented in a table.

FIG. 7 is a diagram showing an example of links determined between anomalous events presented in a table. Applying link analysis to the same table of anomalous events that was presented in FIG. 6, links (relationships) may be found between various anomalous events based on, for example, attributes associated with the events. In the example, a determined link between two anomalous events is shown as a dotted line, such as dotted link 702 that is drawn between the anomalous event determined by Sensor 6 during Day 1 and the anomalous event determined by Sensor 4 during Day 2. As shown in the example, an anomalous event may be determined to be linked to zero or more other anomalous events. As shown in the example, an anomalous event may be linked to another anomalous event (potentially associated with the same or different entities/resources at the same enterprise network) that occurred during another time slot and/or detected by another sensor. Examples of using determined links between anomalous events to determine paths of interest will be described below.

Figure 8:
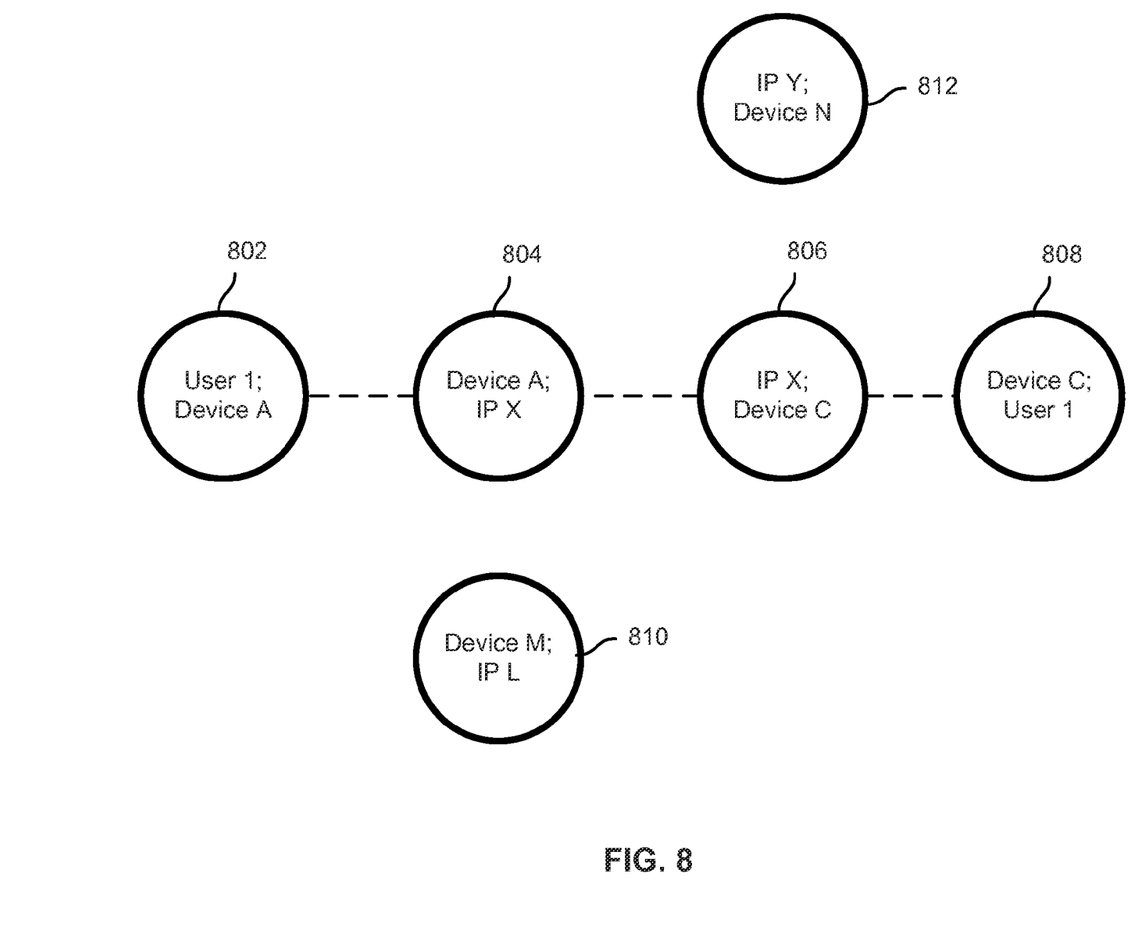
FIG. 8 is a diagram showing an example of determining links between anomalous events based on attributes of the anomalous events.

FIG. 8 is a diagram showing an example of determining links between anomalous events based on attributes of the anomalous events. In the example, each of anomalous events 802, 804, 806, 808, 810, and 812 is shown as a circle and includes two attributes stored with the event. For example, anomalous event 802 is stored with attributes of User 1 and Device A. In this example, a link is determined between two anomalous events based on the two events sharing at least one common attribute. So, anomalous event 802 is linked to anomalous event 804 because they a share common attribute of Device A, anomalous event 804 is linked to anomalous event 806 because they share a common attribute of IP X, and anomalous event 806 is linked to anomalous event 808 because they share a common attribute of Device C. In this example, anomalous events 812 and 810 are not linked to any other anomalous events because they do not have any shareable attributes with another anomalous event. In the example, anomalous events 802, 804, 806 and 808 form a series of linked anomalous events (where anomalous event 802 is adjacent to anomalous event 804, anomalous event 804 is adjacent to anomalous event 806, and so forth) and therefore a path of interest even though there is not necessarily an attribute common to all anomalous events within the path but only that each two linked adjacent anomalous events share at least one common attribute between them.

Figure 9:
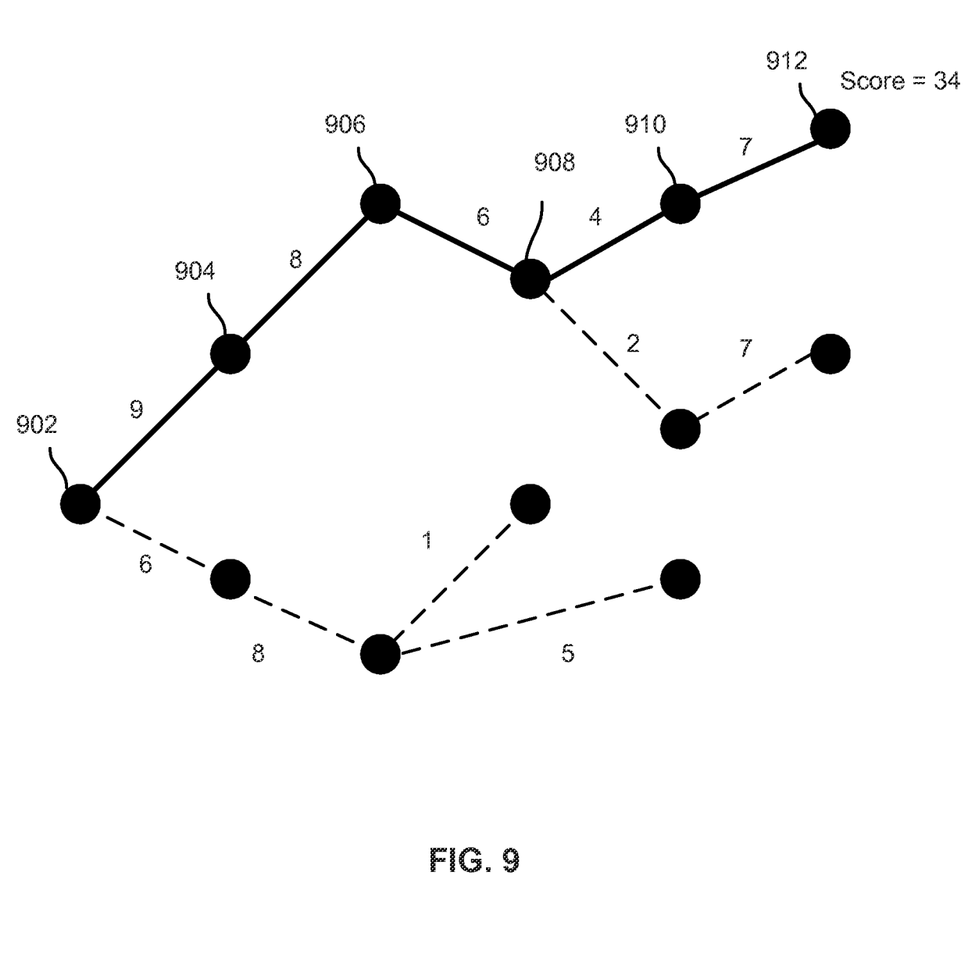
FIG. 9 is a diagram showing an example of a detected path of interest within linked anomalous events.

FIG. 9 is a diagram showing an example of a detected path of interest within linked anomalous events. The example shows the same anomalous events and links from the table of FIG. 7 with scores appearing next to each link. For example, a score may be determined for each link based on a weighting scheme, heuristics, and/or the time elapsed between the occurrences of the two linked anomalous events. For example, the link score for the link between anomalous events 902 and 904 is 9. While not shown in the example, once scores are determined for links, certain links may be pruned from the analysis if the score is too low (e.g., falls below a threshold) or are otherwise not determined to be part of a path of interest. In the example, a series of linked anomalous events such as anomalous events 902, 904, 906, 908, 910, and 912 may be a path of interest. An overall score may be determined for that path of interest based on, for example, the sum of all the separate link scores of the path. If a list of detected paths of interest is to be presented, in some embodiments, the list would include descriptions of determined paths of interest ranked by their associated overall scores.

Figure 10:
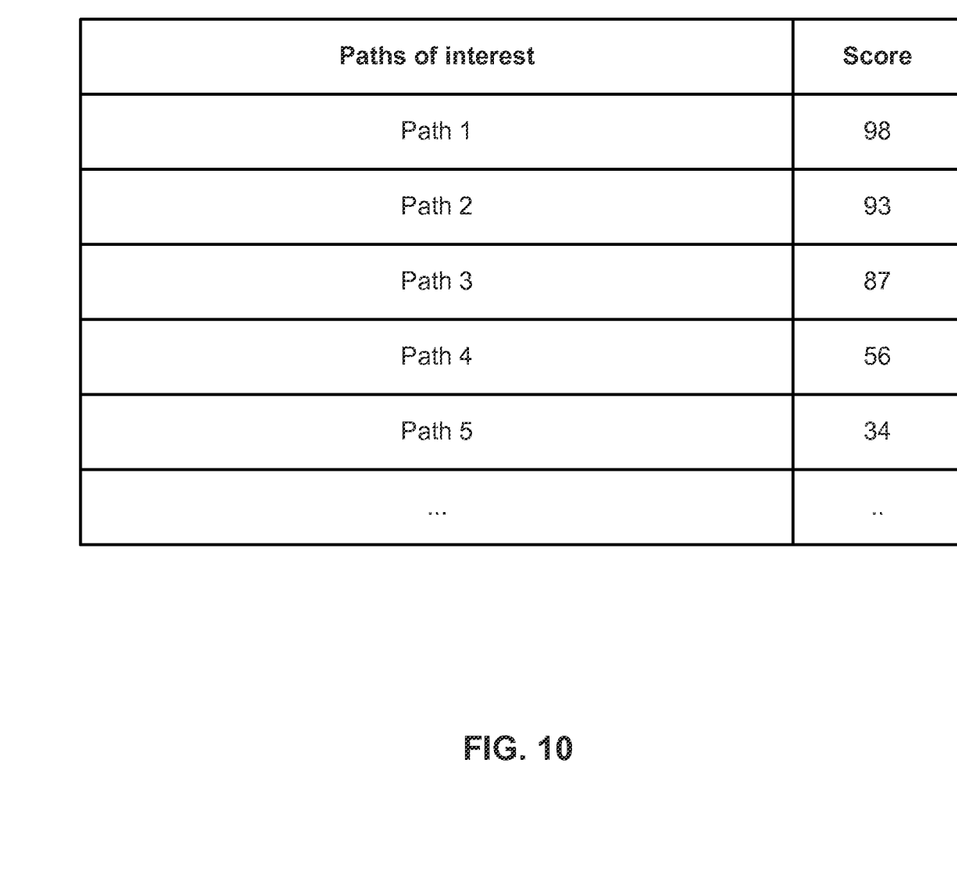
FIG. 10 is a diagram showing an example of a table including a list of ranked paths of interest.

FIG. 10 is a diagram showing an example of a table including a list of ranked paths of interest. In the example, the list of paths of interest is ranked based on their respective overall scores. In the example, each path is identified by a number identifier, although each path may be described by other attributes (e.g., identifiers associated with each anomalous event and/or link within the path) as well. In the example, the overall score of each path is determined based on the sum of all the individual link scores associated with the path. In this example, a path of interest associated with a higher overall score is considered to be more likely to be a security threat and is therefore presented higher on the list of paths to be analyzed (e.g., by security experts and/or data scientists).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An anomaly detection system, comprising:
a processor configured to:
determine a set of anomalous events associated with an enterprise network, wherein each of the set of anomalous events is stored with a corresponding plurality of attributes;
determine a path of interest based at least in part on at least a subset of the set of anomalous events, wherein the path of interest includes a series of two or more anomalous events from the set of anomalous events, wherein each anomalous event of the path of interest is determined to be linked to an adjacent anomalous event of the path of interest based at least in part on a shared attribute that the anomalous event shares with the adjacent anomalous event;
assign to each link associated with adjacent anomalous events comprising the path of interest a link score for that link; and
determine an overall score corresponding to the path of interest based at least in part on respective link scores of one or more links comprising the path of interest; and
a memory coupled to the processor and configured to store data associated with the set of anomalous events.

2. The system of claim 1, wherein one of the set of anomalous events includes an incident suspected as being associated with a security threat.

3. The system of claim 1, wherein the processor is further configured to collect a plurality of security patterns and determine one or more features for one of the plurality of security patterns.

4. The system of claim 1, wherein the processor is further configured to:
build a plurality of sensors, wherein one of the plurality of sensors comprises a model trained on historical event data; and
use the plurality of sensors to determine at least the set of anomalous events based at least in part on current event data.

5. The system of claim 4, wherein the sensor is configured to determine that an event is anomalous based on a threshold score predefined for the sensor.

6. The system of claim 1, wherein to determine the path of interest includes to use link analysis to determine a link between pairs of anomalous events included in the set of anomalous events.

7. The system of claim 1, wherein a link score associated with a link between a first anomalous event and a second anomalous event comprising the path of interest is determined based at least in part on at least some of the stored plurality of attributes corresponding to the first anomalous event and at least some of the stored plurality of attributes corresponding to the second anomalous event.

8. A method for anomaly detection, comprising:
determining, by a processor, a set of anomalous events associated with an enterprise network, wherein each of the set of anomalous events is stored with a corresponding plurality of attributes;
determining a path of interest based at least in part on at least a subset of the set of anomalous events, wherein the path of interest includes a series of two or more anomalous events from the set of anomalous events, wherein each anomalous event of the path of interest is determined to be linked to an adjacent anomalous event of the path of interest based at least in part on a shared attribute that the anomalous event shares with the adjacent anomalous event;
assigning to each link associated with adjacent anomalous events comprising the path of interest a link score for that link; and
determining an overall score corresponding to the path of interest based at least in part on respective link scores of one or more links comprising the path of interest.

9. The method of claim 8, wherein one of the set of anomalous events includes an incident suspected as being associated with a security threat.

10. The method of claim 8, further comprising collecting a plurality of security patterns and determining one or more features for one of the plurality of security patterns.

11. The method of claim 8, further comprising:
building a plurality of sensors, wherein one of the plurality of sensors comprises a model trained on historical event data; and
using the plurality of sensors to determine at least the set of anomalous events based at least in part on current event data.

12. The method of claim 11, wherein the sensor is configured to determine that an event is anomalous based on a threshold score predefined for the sensor.

13. The method of claim 8, wherein determining the path of interest includes using link analysis to determine a link between pairs of anomalous events included in the set of anomalous events.

14. The method of claim 8, wherein a link score associated with a link between a first anomalous event and a second anomalous event comprising the path of interest is determined based at least in part on at least some of the stored plurality of attributes corresponding to the first anomalous event and at least some of the stored plurality of attributes corresponding to the second anomalous event.

15. A computer program product for anomaly detection, the computer program product being embodied in a non-transitory computer readable storage medium and comprising computer instructions for:
determining a set of anomalous events associated with an enterprise network, wherein each of the set of anomalous events is stored with a corresponding plurality of attributes;
determining a path of interest based at least in part on at least a subset of the set of anomalous events, wherein the path of interest includes a series of two or more anomalous events from the set of anomalous events, wherein each anomalous event of the path of interest is determined to be linked to an adjacent anomalous event of the path of interest based at least in part on a shared attribute that the anomalous event shares with the adjacent anomalous event;
assigning to each link associated with adjacent anomalous events comprising the path of interest a link score for that link; and
determining an overall score corresponding to the path of interest based at least in part on respective link scores of one or more links comprising the path of interest.

16. The computer program product of claim 15, wherein one of the set of anomalous events includes an incident suspected as being associated with a security threat.

17. The computer program product of claim 15, further comprising computer instructions for:
building a plurality of sensors, wherein one of the plurality of sensors comprises a model trained on historical event data; and using the plurality of sensors to determine at least the set of anomalous events based at least in part on current event data.

18. The computer program product of claim 17, wherein the sensor is configured to determine that an event is anomalous based on a threshold score predefined for the sensor.

19. The computer program product of claim 15, wherein determining the path of interest includes using link analysis to determine a link between pairs of anomalous events included in the set of anomalous events.

20. The computer program product of claim 15, wherein link score associated with a link between a first anomalous event and a second anomalous event comprising the path of interest is determined based at least in part on at least some of the stored plurality of attributes corresponding to the first anomalous event and at least some of the stored plurality of attributes corresponding to the second anomalous event.

* * * * *